(12) United States Patent
Schauer (10) Patent No.: US 7,814,245 B2
(45) Date of Patent: Oct. 12, 2010

(54) APPARATUS AND METHODS FOR IMPROVED SATA DEVICE INTERACTION WITHOUT A SAS EXPANDER

(75) Inventor: Steven A. Schauer, Loveland, CO (US)

(73) Assignee: LSI Corporation, Milpitas, CA (US)

( * ) Notice: Subject to any disclaimer, the term of this patent is extended or adjusted under 35 U.S.C. 154(b) by 976 days.

(21) Appl. No.: 11/538,900

(22) Filed: Oct. 5, 2006

(65) Prior Publication Data

US 2008/0086576 A1      Apr. 10, 2008

(51) Int. Cl.
*G06F 13/12*   (2006.01)

(52) U.S. Cl. .......................................... 710/62; 710/74

(58) Field of Classification Search ................... 710/62, 710/74

See application file for complete search history.

(56) References Cited

U.S. PATENT DOCUMENTS

| 2005/0015532 | A1 | 1/2005 | Beckett et al. | |
| 2007/0223517 | A1* | 9/2007 | Warren et al. | 370/463 |
| 2008/0098106 | A1* | 4/2008 | Mimatsu | 709/223 |

* cited by examiner

*Primary Examiner*—Alford W Kindred
*Assistant Examiner*—David E Martinez
(74) *Attorney, Agent, or Firm*—Duft Bornsen & Fishman, LLP (57) ABSTRACT

Apparatus, circuits, systems, and associated methods for integrating SAS/STP control in a SATA storage device. Features and aspects hereof permit direct coupling of the SATA storage device to either a SATA host or to an STP initiator without requiring an intervening SAS expander.

11 Claims, 5 Drawing Sheets

APPARATUS AND METHODS FOR IMPROVED SATA DEVICE INTERACTION WITHOUT A SAS EXPANDER

BACKGROUND OF THE INVENTION

1. Field of the Invention

The invention relates generally to networked storage systems including Serial Attached SCSI ("SAS") initiator devices and Serial Advanced Technology Attached ("SATA") target devices and more specifically relates to improved designs of the SATA device to incorporate minimal SAS capability to obviate the need for a SAS expander intermediate the initiator and target devices.

2. Discussion of Related Art

In the storage networking arts, it has become common to utilize high speed serial interconnections between storage devices (e.g., disk drives) and associated controller devices (e.g., storage subsystem controllers and/or host system adapters). High speed serial interconnection utilizes a simpler, lower cost cabling as compared to prior wide, parallel bus interconnect architectures. In particular, SAS has been widely adopted as a preferred high speed serial interconnection for storage devices and associated controllers. The SAS standards (publicly available for example at www.t10.org) allow for utilization of the long standardized SCSI command set while utilizing simpler, lower cost high speed serial cabling and associated protocols. SATA provides a different command structure that may also be transmitted utilizing high speed SAS interconnections between appropriate controlling devices and the SATA storage devices (e.g., disk drives).

In one particularly popular configuration, SATA exchanges may be transmitted over a SAS high speed serial interconnection utilizing the SATA tunneling protocol ("STP") specified within the SAS standards. STP utilizes particular sequences of SAS directives to initially establish the desired logical interconnection. Once the STP protocol establishes the SAS logical interconnection between a SAS initiator and the SATA device, all subsequent exchanges utilize the SATA command structure for exchange of commands, status, and data therebetween.

Present day SATA devices strive to lower cost and complexity of the device in a number of respects. In particular, present SATA devices do not support any SAS/STP protocol exchanges required to initially establish a desired SAS interconnection. Rather, the SAS specifications provide for connection of a SAS initiator to a SATA target device through an intermediate SAS expander. The SAS expander interacts with the SAS initiator on a port of the expander to initially establish the desired SAS/STP connection to an identified SATA device coupled to another port of the SAS expander. Once the SAS initiator and SAS expander have successfully established the desired SAS/STP connection to the identified SATA device, all further exchanges between the SAS initiator and SATA device utilize standard SATA communication and command protocols through passing through the SAS expander.

The requirement of providing a SAS expander in all contexts gives rise to a problem in that a SAS expander is a relatively complex, costly component of a storage network. In particular, in a manufacturing or engineering test environment testing the design of a customized SATA device, the manufacturer's test environment must necessarily include a costly, complex SAS expander to effectuate required testing.

Another approach is to integrate fully functional SAS/STP target logic within the customized SATA device to allow the SATA device to directly communicate with the SAS initiator in establishing the desired interconnection. However, such a fully functional SAS/STP logic component adds significant cost and complexity to the SATA device control logic without providing substantial benefit to the overall system architecture. Such an integration of complex circuitry with the SATA device is costly both in terms of additional circuit die area as well as complexity of systems software utilizing the SATA device. The system software must be adapted to appropriately configure a fully functional SAS/STP component within the SATA device though the SAS/STP protocols are only briefly utilized to establish the SAS interconnection.

It is evident from the above discussion that a need exists for an improved circuit, system, and associated methods to permit establishment of a required SAS/STP connection with SATA devices without the need for a SAS expander intermediate the SAS initiator and enhanced SATA device.

SUMMARY OF THE INVENTION

The present invention solves the above and other problems, thereby advancing the state of the useful arts, by providing circuits, systems, and methods for direct coupling of a SATA storage device to either a SATA host or to an STP initiator without requiring an intervening SAS expander. PHY layer components of the enhanced SATA storage device detect coupling to either a SATA or STP initiator, perform appropriate speed negotiation for the detected initiator and permit exchanges through either protocol.

In one aspect hereof a circuit is provided integrated within a SATA storage device. The circuit includes a SATA protocol core for processing SATA protocol exchanges with an attached host device. The circuit also includes an STP core for processing STP protocol exchanges with the attached host device. The circuit further includes a PHY link control element coupled to both the SATA protocol core and to the STP protocol core and adapted for processing of both STP and SATA link level exchanges with the attached host device.

Another aspect hereof provides a method associated with operation of a SATA storage device. The method includes coupling the SATA storage device to either a SATA host or to an STP initiator. The method also includes operating the SATA storage device such that the SATA storage device responds to the SATA host or responds to the STP initiator without requiring an intervening SAS expander.

DETAILED DESCRIPTION OF THE DRAWINGS

Figure 1:
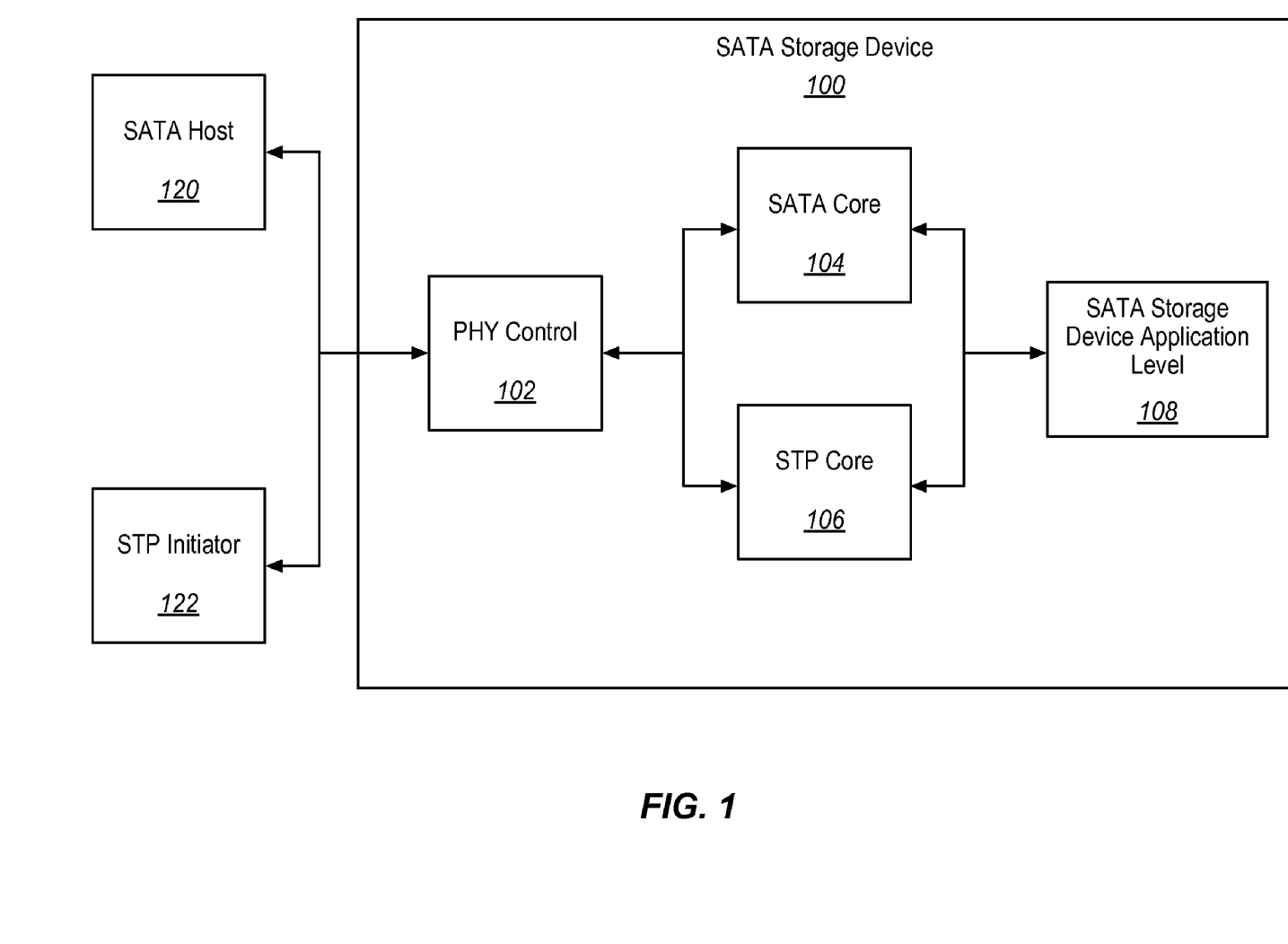
FIG. 1 is a block diagram of an exemplary embodiment of a SATA storage device enhanced in accordance with features and aspects hereof.

FIG. 1 is a block diagram of a SATA storage device 100 enhanced in accordance with features and aspects hereof to allow coupling to either a SATA host 120 or to an STP initiator 122. As noted above, a SATA host 120 may be directly coupled to a standard SATA storage device. However, as presently practiced in the art, an STP initiator device 122 must be coupled through a SAS expander to allow coupling to a SATA storage device. By contrast, SATA storage device 100 is enhanced in accordance with features and aspects hereof to allow direct coupling between an STP initiator 122 and the SATA storage device 100 without the need for an intervening SAS initiate SAS expander.

Enhanced SATA storage device 100 may include a SATA storage device application layer 108 for processing SATA exchanges with either the SATA host 120 or with the STP initiator 122. SATA storage device application layer 108 is therefore responsible for all processing of the SATA information exchanged with an initiator regardless of whether it is exchanged through a SATA connection or an STP connection. The application layer 108 is coupled to either of two link and transport layers each corresponding to one of the supported protocols. SATA core 104 includes the link and transport layer logic associated with exchanges direct exchanges of SATA information with a SATA or STP initiator 120 or 122, respectively. STP core 106 includes logic for link and transport layer implementations of the SAS/STP protocol supported by the enhanced SATA storage device 100. The SAS/STP core 106 may be implemented as a fully functional SAS/STP core protocol for both link in transport layers or may be implemented as a simplified core providing only minimal functionality needed in the enhanced SATA storage device 100. In accordance with features and aspects hereof, the only required features of STP core 106 are sufficient features to allow opening/establishment of an SAS/STP connection with a SAS/STP initiator 122 and additional logic features to allow closing of a previously opened connection. For example, processing of a SAS OpenAddress frame and corresponding close primitives may be the only features required of STP core 106 to allow enhanced support in accordance with features and aspects hereof.

SATA core 104 and STP core 106, implementing respective link and transport logic, are both coupled to PHY control 102 responsible for lower level physical control of the high speed serial link. In accordance with features and aspects hereof, PHY control 102 is enhanced to but the detect whether a particular connection is established with the SATA host 120 or with the STP initiator 102. In particular, PHY control 102 is responsible for detecting that SAS/STP out of band ("OOB") signals have been transmitted and/or received or that SATA OOB sequences have been transmitted and/or received indicative of a connection by an STP initiator or SATA host, respectively.

Those of ordinary skill in the art will readily recognize numerous additional functional elements within a fully operational SATA storage device 100. Such other functional elements are well known to those of ordinary skill in the art and are omitted from FIG. 1 for simplicity and brevity of this discussion. Further, those of ordinary skill in the art will readily recognize that the depicted functional elements and other elements may be further integrated as logic circuits or may be segregated into any number of distinct functional modules within circuits of the enhanced SATA storage device 100. Such design choices are well known to those of ordinary skill in the art.

Figure 2:
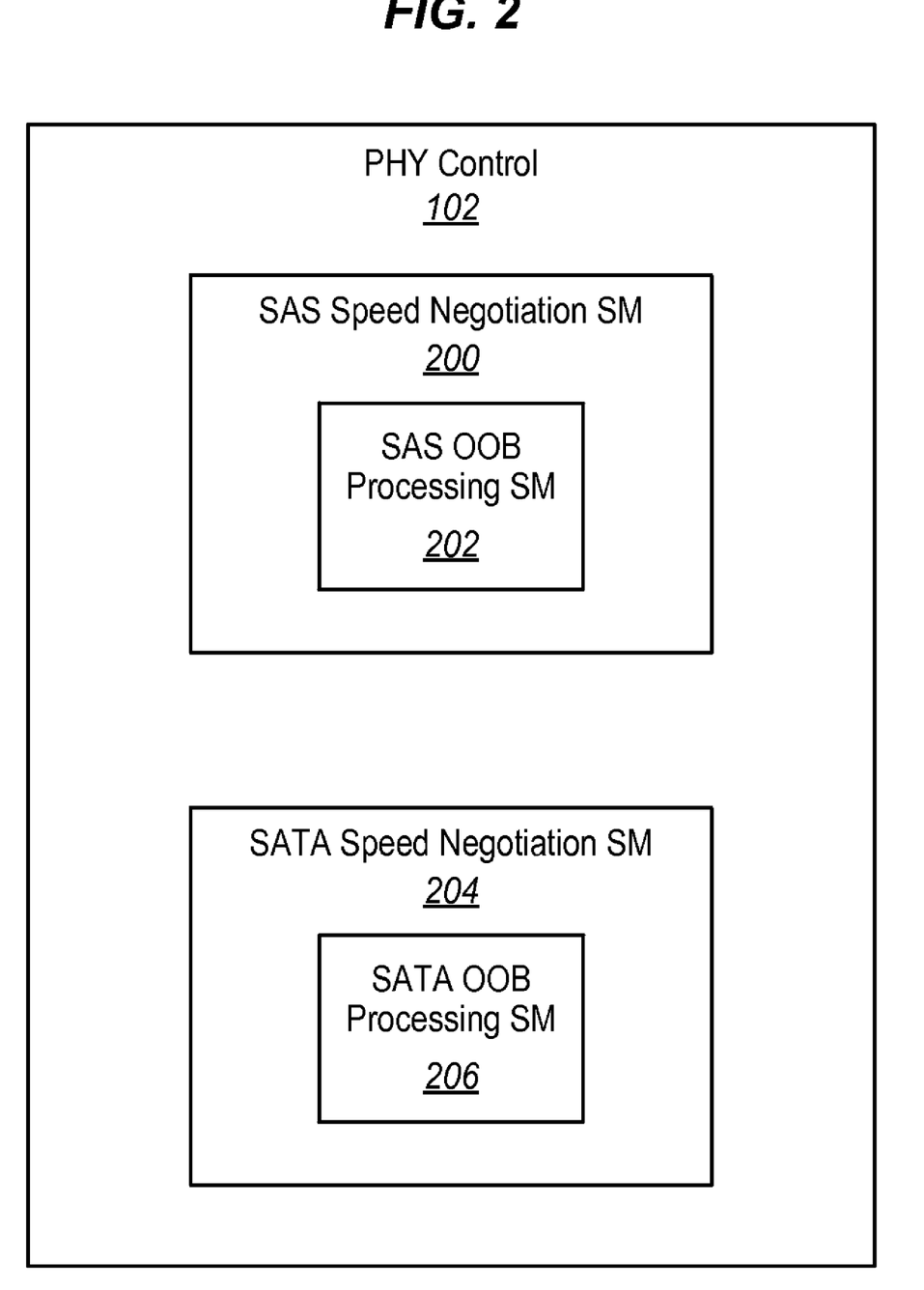
FIG. 2 is a block diagram providing additional exemplary details of the PHY control element of FIG. 1.

FIG. 2 is a block diagram providing additional exemplary details of the PHY control element 102. In particular, PHY control element 102 includes logic 200 for processing SAS speed negotiation. SAS speed negotiation logic 200 may be implemented as a state machine or any other model for implementing combinatorial logic as a matter of design choice. In particular, SAS speed negotiation logic 200 may include SAS OOB processing logic 202 for recognizing and exchanging OOB sequences associated with commencement of SAS speed negotiation. As above, SAS OOB processing logic 202 may be implemented as a state machine or any other model for implementation of combinatorial logic suitable for the intended purpose.

PHY control logic 102 also includes SATA speed negotiation logic 204. SATA speed negotiation logic 204 may also be implemented in accordance with a state machine model or any other suitable embodiment for combinatorial logic to implement the intended SATA speed negotiation function. In particular, SATA speed negotiation logic 204 may include SATA OOB processing logic 206 for recognizing and exchanging SATA compliant OOB sequences with an appropriate SATA host. As above, SATA OOB processing logic 206 may be implemented in accordance with a state machine model or any other suitable model for implementation of appropriate combinatorial logic.

Those of ordinary skill in the art will readily recognize a variety of specific embodiments for implementing both SAS speed negotiation logic element 200 and SATA speed negotiation logic element 204, each including corresponding OOB processing logic 202 and 206, respectively. Specific signaling standards and sequences for both SAS speed negotiation (including SAS OOB processing) and SATA speed negotiation (including SATA OOB sequence processing) are well known to those of ordinary skill in the art and well documented in readily available published standards (see for example, www.t10.org).

Those of ordinary skill in the art will readily recognize a variety of additional functional elements within a fully operational PHY control logic element 102. Such additional features are well known to those of ordinary skill in the art and are omitted herein solely for simplicity and brevity of this discussion. Still further, those of ordinary skill in the art will readily recognize that depicted functional elements may be integrated or segregated into more or fewer modules within a PHY control logic element 102. Such design choices are well known to those of ordinary skill in the art.

In accordance with features and aspects hereof, PHY control 102 includes both SAS speed negotiation and SATA speed negotiation all embedded within a SATA storage device. Thus, the SATA storage device in accordance with features and aspects hereof is capable of connecting to either a SATA host or coupling directly to an STP initiator without the need for an intervening SAS expander.

Figure 3:
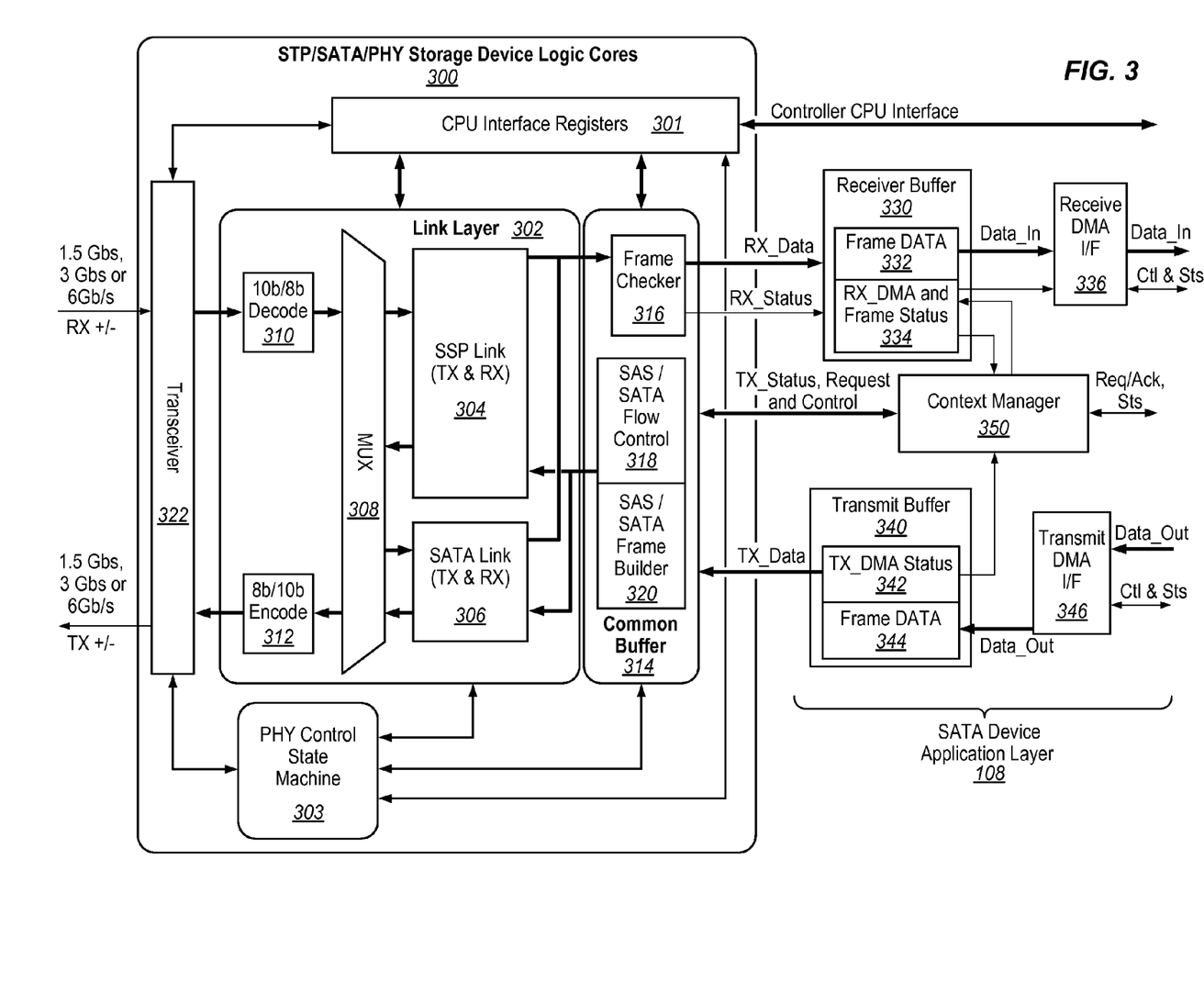
FIG. 3 is a block diagram of an exemplary circuit providing enhanced STP and SATA coupling of a SATA storage device in accordance with features and aspects hereof.

FIG. 3 depicts additional exemplary components of an enhanced SATA device such as that depicted in FIG. 1. The enhanced SATA storage device may include core logic 300 including a PHY control state machine 303 coupled to corresponding STP and SATA link and transport layer logic 302. As shown in FIG. 3, the STP and SATA link and transport layer logic and the PHY control state machine logic elements may be designed as integrated within a single integrated circuit or may be separated into multiple logic circuit elements.

Core logic 300 may include a CPU interface and registers element 301 providing a standardized interface to a controller CPU (not shown) within the SATA device application layer 108. Such a CPU may, for example, provide overall control of exchanges between an attached initiator and the SATA application layer 108 to process SATA information exchanged via either the SATA protocol or the STP protocol. CPU interface and registers element 301 may include a standard collection of registers for configuring operation of the logic core 300 as well as for evaluating status of the operating logic core 300. Registers accessible by the external CPU of the application layer 108 may be memory addressable or mapped as I/O ports as a matter of design choice well known to those of ordinary skill in the art.

Link layer 302 within logic core 300 generally implements, combinatorial logic for serial SCSI protocol ("SSP") in element 304 and for SATA link control protocols in element 306. The SSP link element 304 provides link and transport layer management for transfers of STP protocol through the SAS communication medium to an attached STP initiator. SATA link element 306 provides SATA protocol link and transport layer control for exchanges between the application layer 108 and an attached SATA host. SSP link element 304 and SATA link element 306 are coupled through multiplexer 308 to the SAS communication medium. Decoder 310 decodes received SAS or SATA communications from transceiver 322 for application through multiplexer 308 to either SSP link element 304 or to SATA link element 306. Encode element 312 encodes SAS/SSP information or SATA information from either SSP link 304 or SATA link 306, respectively, through multiplexer 308 for application to the serial communication medium via transceiver 322. Transceiver 322 modulates and demodulates transmissions over the high speed serial medium as encoded and decoded by elements 310 and 312.

Common buffer logic 314 provides frame management and flow control logic for both SSP link element 304 and SATA link element 306. Frame checker 316 within common buffer control element 314 validates all received frames as regards transmission and transport errors. Frames may be rejected or corrected when possible utilizing error detection and correction information associated with a received frame in accordance with standard protocol management of SAS and SATA exchanges. SAS/SATA flow control element 318 applies flow control signals to SSP link element 304 and to SATA link element 306 indicative of the current space available in the received buffer 330 and/or the transmit buffer 340. SAS/SATA frame builder element 320 represents logic operable to construct appropriate frame structures and encodings for transmission over the SSP link 304 and/or over the SATA link 306.

The SATA device application layer 108 may comprise a number of elements useful for the application layer utilization of the SATA data exchanged between the enhanced SATA storage device and an attached SATA host or STP initiator. As noted, the application layer element 108 may include receive buffer 330 and transmit buffer 340. In addition to standard memory components comprising such buffers represented as frame data 332 and 344, respectively, the buffers may include associated status and control information particularly useful in DMA interaction. Thus, RX_DMA and frame status 334 represents DMA information and other status information useful in control of DMA exchanges of frame data 332 under control of received DMA interface 336. In like manner, TX_DMA status 342 provides useful information regarding DMA transfers involving frame data 344 within transmit buffer 340. Transmit DMA interface 346 represents appropriate control logic to perform such DMA transfers through the transmit buffer 340 and Receive DMA interface 336 provides similar control logic for DMA transfer through receive buffer 330. Element 350 represents logic to manage the overall interaction between the application layer element 108 and the lower layers of core logic 300 implementing SAS/SSP link and transport control and SATA link and transport control as well as lower level PHY link layer control.

A general or special purpose processor (not shown in FIG. 3) couples to and interacts with other elements of the application layer 108 to control overall operation of the SATA device. Those of ordinary skill in the art will readily recognize a wide variety of additional elements useful in a fully functional SATA storage device. In particular, logic elements associated with control and manipulation of data persistently stored in such a storage device are well known to those of ordinary skill in the art and are omitted herein for simplicity and brevity of this discussion.

In accordance with features and aspects hereof, link layer 302 which includes capability for both SSP link and transport layer control 304 and SATA link and transport layer control 306 are both coupled to a common PHY control element 303 within core logic 300. Thus, an enhanced SATA storage device utilizing such logic in accordance with features and aspects hereof is capable of coupling to a SATA host or to an STP initiator without the need for an intervening SAS expander previously relied upon for translating between STP protocols and standard SATA protocols. Thus, a storage device utilizing logic circuits depicted in FIG. 3 permits more flexible system integration and manufacturing testing by obviating the need for a SAS.

Figure 4:
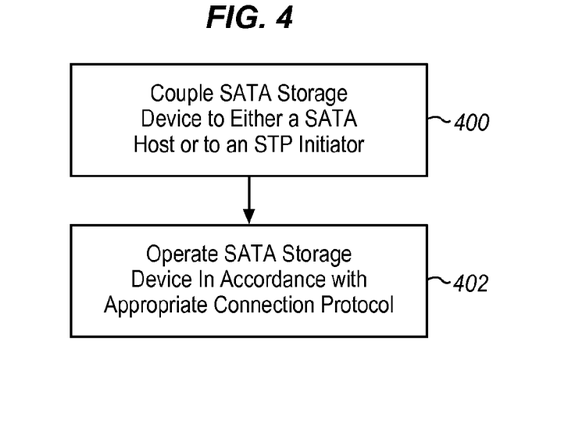
FIG. 4 is a flowchart or an exemplary method in accordance with features and aspects hereof to operate an enhanced SATA storage device.

FIG. 4 is a flowchart describing a method in accordance with features and aspects hereof to operate an enhanced SATA storage device as exemplified in FIGS. 1 through 3. In step 400, the enhanced SATA storage device is coupled to either a SATA host or coupled to an STP initiator as appropriate for a particular application environment at the period. Element 402 then represents ongoing operation of the enhanced SATA storage device in accordance with an appropriate connection protocol corresponding to the particular type of initiator to which the storage device is coupled. For example, where the enhanced storage device is coupled to a SATA host by operation of element 400, ongoing operation of the SATA storage device is in compliance with the SATA protocols. On the other hand, where the enhanced SATA storage device is couple to an STP initiator by operation of element 400 above, ongoing operation of the enhanced SATA storage device is in accordance with the SAS/STP protocol specifications. Thus, the enhanced SATA device provides more flexibility as compared to prior SATA devices in that it may be coupled directly to a SATA host or may be directly coupled to an STP initiator without the need for any intervening SAS expander. As noted above, such flexibility is particularly useful in a manufacturing test environment so that they SATA storage device may be tested on any available initiator but without requiring a costly, complex SAS expander to perform manufacturing testing and validation. Such a flexible enhanced SATA storage device may also be usefully applied in end user applications where a particular system may need to directly couple to the enhanced SATA device without need for acquisition and configuration of costly, complex SAS expanders.

Figure 5:
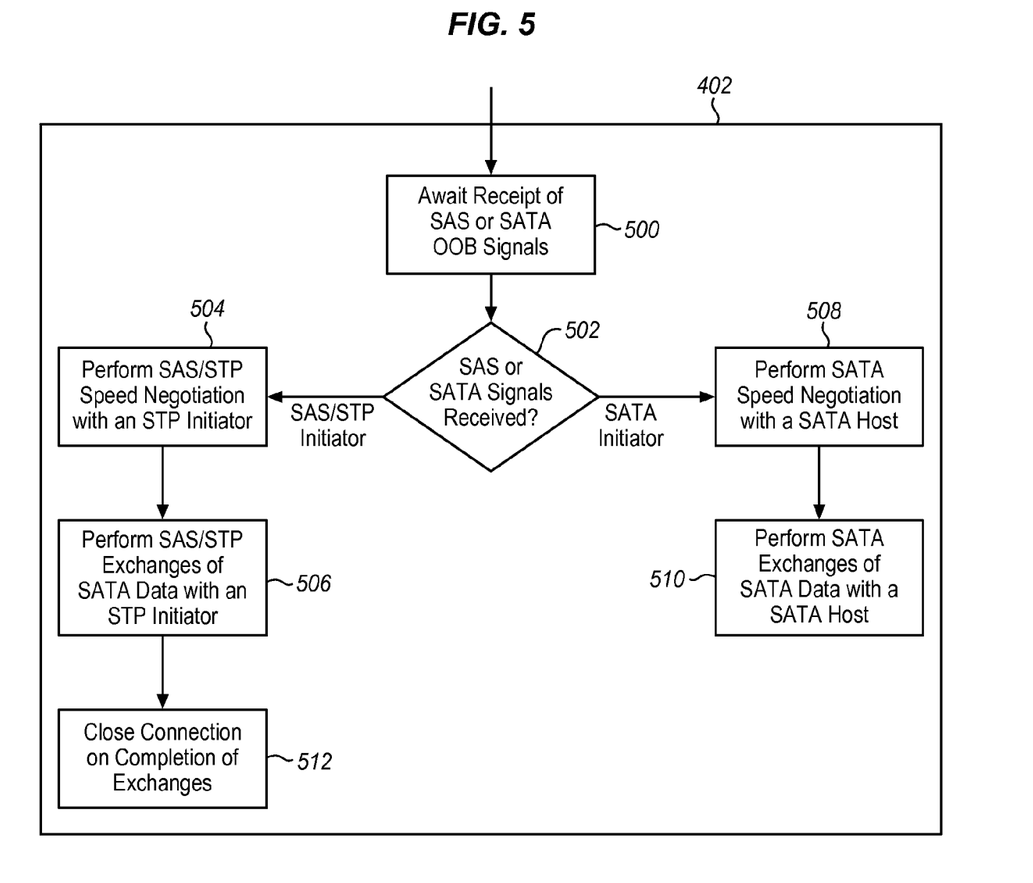
FIG. 5 is a flowchart of a method providing exemplary details of ongoing operation of a SATA device in accordance with the method of FIG. 4

FIG. 5 is a flowchart providing exemplary additional details of the ongoing operation of an enhanced SATA device as discussed above in element 402. As discussed above, the enhanced SATA device in accordance with features and aspects hereof is adapted to process both SAS and SATA speed negotiation exchanges. In establishing either a SAS open connection or a SATA connection a first step in both protocols provides for speed negotiation to derive a mutually acceptable speed between the SATA storage device and an initiator for ongoing communications through the open connection. Both the SAS and SATA protocols initiate such speed negotiation by transmitting OOB sequences. Such OOB sequences are generally signals outside the context of normal protocols exchanges for transmission of control and data.

Element 500 of FIG. 5 is therefore first operable to await receipt of a SAS or SATA OOB sequence indicative of initiation of a speed negotiation process as a prelude to establishment of a connection between the enhanced SATA storage device and some appropriate initiator. Element 502 is operable to determine whether the received OOB sequence represents an OOB sequence of a SAS initiator or that of a SATA host. The PHY layer is adapted in accordance with features and aspects hereof to recognize and process both SAS OOB sequence and SATA OOB sequence. If the PHY layer determines that the received OOB sequences represents a SAS protocol OOB sequence, element 504 is next operable to perform speed negotiation exchanges with an attached STP protocol initiator. Element 506 is then operable to perform data and control information exchanges between the enhanced but the SATA storage device and the STP initiator in accordance with the particular application requirements and the STP protocol. Lastly, element 512 is operable to close the opened connection responsive to completion of all data and control information exchanges intended by the STP application.

By contrast, if element 502 determines that the received OOB sequence represents that of a SATA host, element 508 is operable to perform SATA speed negotiation with an attached a SATA host. As noted above the particular signals exchanged for SATA speed negotiation are similar to those of a SAS speed negotiation process but sufficiently different to require different processing for speed negotiation. Element 508 therefore completes the speed negotiation process between the enhanced SATA storage device and an attached SATA host. Element 510 then performs SATA protocol compliant exchanges between the enhanced SATA storage device and the attached SATA host.

Those of ordinary skill in the art will readily recognize numerous additional steps in the methods of FIGS. 4 and 5 in a fully functional enhanced SATA storage device. Such additional steps are well known to those of ordinary skill in the art as specified by respective SAS and SATA protocol specifications. Protocol specifications for these and other well known serial attach protocol standards are readily available to those of ordinary skill in the art at, for example, www.t10.org and other well known publishing sites. Any such additional steps and details are well known to those of ordinary skill in the art and are omitted here simply for brevity of this discussion.

Figure 6:
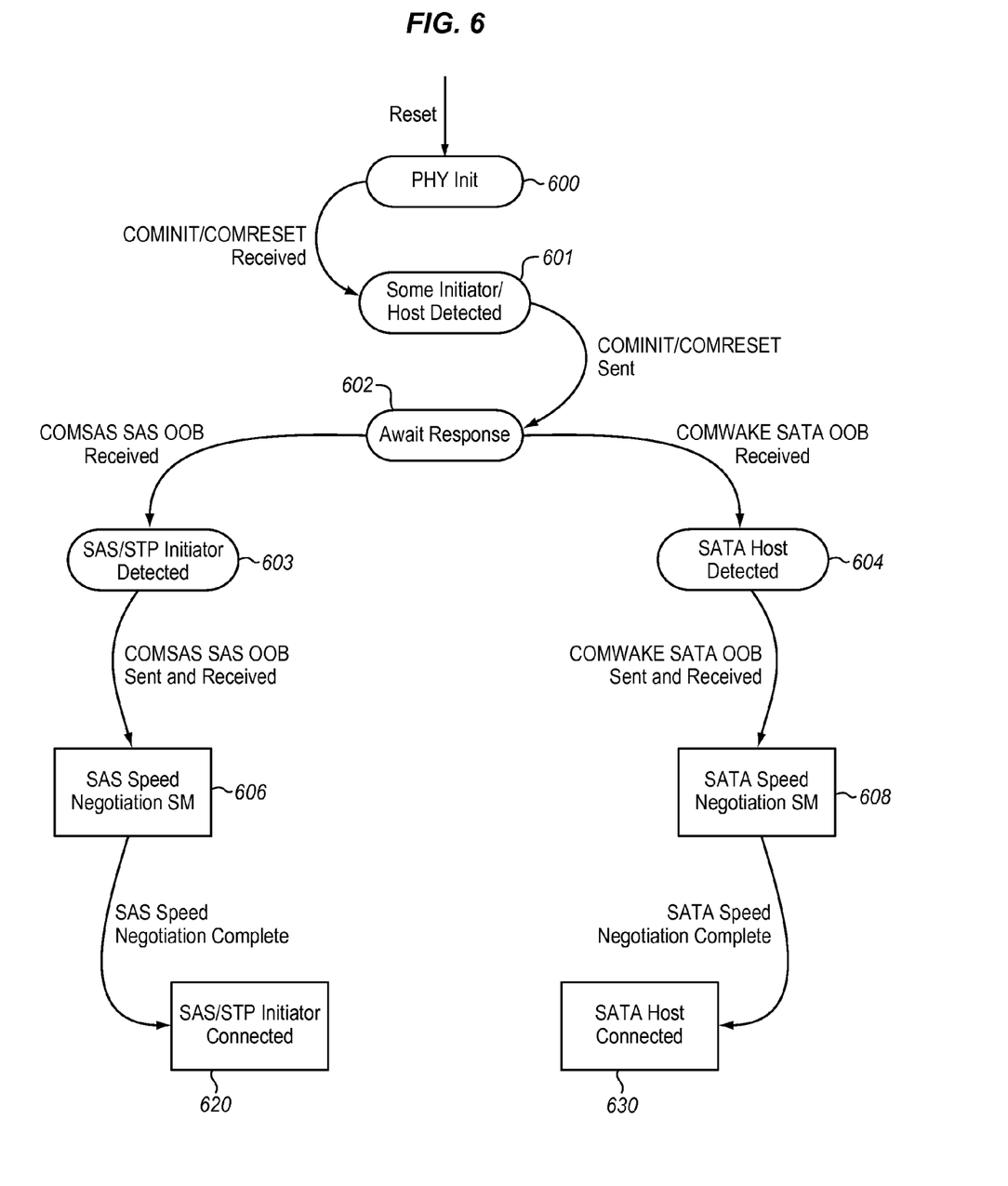
FIG. 6 is an exemplary state machine model describing logic for operating an enhanced SATA storage device in accordance with features and aspects hereof.

FIG. 6 is a state machine diagram representing exemplary operation of an enhanced SATA storage device in accordance with features and aspects hereof to establish a connection with either a SATA host or with a SAS initiator. Those of ordinary skill in the art will readily understand that circuit implementations for protocol devices are often modeled in accordance with state machine descriptions and diagrams. Thus, the state machine of FIG. 6 represents an exemplary circuit embodiment of features and aspects hereof to operate an enhanced SATA storage device in accordance with either the SATA protocol when coupled to a SATA host or in accordance with the SAS protocol when coupled directly to an STP initiator. Further, those of ordinary skill in the art what will readily recognize standard design approaches and methodologies to translate a state machine diagram directly to corresponding, combinatorial logic circuits.

State 600 represents an initialization state of the state machine entered in response to any reset condition (e.g., a power on reset or any other analogous hard or soft reset operation). The state machine remains in the initialization state 600 until an event indicates that a COMINIT SAS OOB sequence or a COMRESET SATA OOB sequence has been received. Though these two sequences are indistinguishable, they are referred to by different names in the related specifications. When such a sequence is received, the state machine recognizes that some host/initiator device is attached and transitions to state 601. The state machine then responds to the received OOB sequence with the same COMINIT/COMRESET sequence and immediately transitions to state 602. The state machine then remains in state 602 awaiting receipt of a next OOB sequence in accordance with the SAS or SATA specifications. In the SAS specifications, the speed negotiation process calls next for a COMSAS OOB sequence to be exchanged. In the SATA standards, a COMWAKE OOB sequence is next exchanged. These two OOB sequences are distinguishable by the PHY link control state machine logic.

The state machine model remains in state 602 until either a COMSAS SAS OOB sequence is received or until a COMWAKE SATA OOB sequence is received. Receipt of a COMSAS OOB sequence indicates that the attached device is a SAS initiator device. Receipt of a SATA COMWAKE OOB sequence indicates that the attached device is a SATA host device. If a COMSAS OOB is received, the state machine transitions to state 603 and completes the COMSAS OOB exchange by sending a responsive COMSAS OOB sequence. The state machine then transitions to state 606 that represents all processing to complete a SAS speed negotiation. State 606 represents an entire state machine for the completion of a SAS speed negotiation process. The state machine for completing a SAS speed negotiation process is well known to those of ordinary skill in the art and is documented in the relevant SAS specifications well known and readily available to those of ordinary skill in the art. Details of the completion of such a SAS speed negotiation processing are omitted here for simplicity and brevity of this discussion. Following completion of the SAS speed negotiation process represented as state machine 606, the enhanced SATA storage device transitions to element 620 representing ongoing communication with the attached SAS/STP initiator. Again, state 620 represents all processing of a state machine model or other combinatorial logic and processing sequences for exchanging information between the enhanced SATA storage device and an attached STP initiator. As above with respect to state 606, state machine logic and other combinatorial logic or processing steps for completing such STP exchanges are well known to those of ordinary skill in the art and are documented in the appropriate SAS/STP specifications readily available. These details are omitted here for simplicity and brevity of the discussion.

Returning again to state 602, if a COMRESET SATA OOB sequence is exchanged and a COMWAKE OOB sequence is received (indicative of a SATA host being attached), the state machine transitions to state 604 indicating that a SATA host has been detected. The state machine sends a responsive COMWAKE OOB sequence and then transitions to state 608 representative of all processing necessary to complete the standard SATA speed negotiation process. Details of the standard SATA speed negotiation process are well known to those of ordinary skill in the art and documented in the applicable portions of the SAS/SATA specifications readily available to those of ordinary skill in the art. Upon completion of the SATA speed negotiation state machine processing, the state machine transitions to state 630 representative of all processing to exchange information with the attached SATA host. State machine and other combinatorial logic or processing steps associated with such SATA exchanges are well known to those of ordinary skill in the art and are documented in the appropriate SAS/SATA specifications readily available to those skills in the art.

Those of ordinary skill in the art will readily recognize that the state machine of FIG. 6 is dramatically simplified for brevity of this discussion to indicate only the particular state transitions related to features and aspects hereof for enhancing the SATA storage device. More particularly, the state machine of FIG. 6 represents the processing of the enhanced SATA storage device that permits the PHY link layer logic to detect connection with either a SATA host or a direct connection to an STP initiator without requiring an intervening SAS expander. Thus, in accordance with features and aspects hereof, the enhanced SATA storage device utilizing the exemplary state machine of FIG. 6 enhances flexibility allowing direct coupling to either a SATA host or an STP initiator devoid of an intervening SAS expander. Numerous additional states useful for implementing a fully functional PHY link layer or other associated protocol layers of the enhanced SATA device will be readily understood by those of ordinary skill in the art. Further, those of ordinary skill in the art will recognize a wide variety of equivalent state machines useful for implementing the enhanced features of a SATA storage device in accordance with features and aspects hereof. Still further, those of ordinary skill in the art will recognize modifications to the simplified state machine to enable error recovery as well as to permit configuration options to restrict the PHY link layer to particular types of processing such as SAS only or SATA only.

While the invention has been illustrated and described in the drawings and foregoing description, such illustration and description is to be considered as exemplary and not restrictive in character. One embodiment of the invention and minor variants thereof have been shown and described. Protection is desired for all changes and modifications that come within the spirit of the invention. Those skilled in the art will appreciate variations of the above-described embodiments that fall within the scope of the invention. In particular, those of ordinary skill in the art will readily recognize that features and aspects hereof may be implemented equivalently in electronic circuits or as suitably programmed instructions of a general or special purpose processor. Such equivalency of circuit and programming designs is well known to those skilled in the art as a matter of design choice. As a result, the invention is not limited to the specific examples and illustrations discussed above, but only by the following claims and their equivalents.

What is claimed is:

1. A circuit integrated within a serial advanced technology attached (SATA) storage device, the circuit comprising:
   a SATA protocol core for processing SATA protocol exchanges with an attached host device;
   a SATA tunneling protocol (STP) core for processing STP protocol exchanges with the attached host device; and
   a PHY link control element coupled to both the SATA protocol core and to the STP protocol core and adapted for processing of both STP and SATA link level exchanges with the attached host device,
   wherein the SATA storage device is adapted to couple to a SATA host through the circuit and is further adapted to couple to a serial attached SCSI (SAS) initiator through the circuit using the STP protocol without requiring an intervening SAS expander.

2. The circuit of claim 1
   wherein the PHY link control element further comprises:
   a serial attached SCSI (SAS) speed negotiation element; and
   a SATA speed negotiation element.

3. The circuit of claim 2
   wherein the SAS speed negotiation element further comprises:
   a SAS out of band (OOB) element for receiving SAS OOB sequences in speed negotiation,
   wherein the PHY link is adapted to interact with the STP core responsive to receiving SAS OOB sequences.

4. The circuit of claim 2
   wherein the SATA speed negotiation element further comprises:
   a SATA out of band (OOB) element for receiving SATA OOB sequences in speed negotiation,
   wherein the PHY link is adapted to interact with the SATA core responsive to receiving SATA OOB sequences.

5. The circuit of claim 1
   wherein the STP core is adapted to process only SAS exchanges to establish and close an STP connection between the SATA storage device and a SAS initiator.

6. A method associated with operation of a serial advanced technology attached (SATA) storage device, the method comprising:
   establishing a connection between the SATA storage device and a SATA host or between the SATA storage device and a SATA tunneling protocol (STP) initiator
   determining whether the SATA storage device is coupled to the SATA host or is coupled to the STP initiator;
   responsive to a determination that the SATA storage device is coupled to the SATA host, operating the SATA storage device to respond to the SATA host; and
   responsive to determining that the SATA storage device is coupled to the STP initiator, operating the SATA storage device to respond to the STP initiator without requiring an intervening SAS expander between the SATA storage device and the STP initiator.

7. The method of claim 6
   wherein the step of operating the SATA storage device to respond to the STP initiator further comprises:
   exchanging SATA frames with the STP initiator through the STP connection; and
   closing the STP connection.

8. The method of claim 6
   wherein the step of operating the SATA storage device to respond to the SATA host further comprises:
   exchanging SATA frames with the SATA host through the SATA connection.

9. The method of claim 6
   wherein the step of establishing a connection the STP initiator further comprises:
   performing speed negotiation with the STP initiator device.

10. The method of claim 6
    wherein the step of establishing a connection with the SATA host further comprises:
    performing speed negotiation with the SATA host device.

11. The method of claim 6
    wherein the step of establishing further comprises:
    recognizing SATA out of band (OOB) signals;
    performing SATA protocol speed negotiation with the SATA host device in response to recognizing SATA OOB sequences;
    recognizing SAS OOB sequences; and
    performing SAS protocol speed negotiation with the STP initiator device in response to recognizing SAS OOB sequences.

* * * * *